Patented Apr. 11, 1933

1,903,501

UNITED STATES PATENT OFFICE

WILLIAM S. CALCOTT, OF PENNS GROVE, NEW JERSEY, ALBERT S. CARTER, OF WILMINGTON, DELAWARE, AND FREDERICK B. DOWNING, OF CARNEYS POINT, NEW JERSEY, ASSIGNORS TO E. I. DU PONT DE NEMOURS & COMPANY, OF WILMINGTON, DELAWARE, A CORPORATION OF DELAWARE

HYDROGENATION OF HYDROCARBONS

No Drawing.   Application filed March 24, 1930.  Serial No. 438,658.

This invention relates to the hydrogenation of unsaturated compounds and particularly to the catalytic hydrogenation of polymerizable acetylene polymers.

Prior art

It is known that by passing acetylene into a mixture of ammonium chloride, water, cuprous chloride and copper powder of suitable proportions and under proper conditions, unsaturated hydrocarbons of higher molecular weight are formed. These hydrocarbons may be separated by distillation from the reaction mixture. The product is a low-boiling (80–85° C.) highly unsaturated liquid. This liquid is apparently made up of a number of constituents, apparently having the general formula $C_xH_x$. The major constituent is called divinylacetylene and most probably has the empirical formula $C_6H_6$. Others formed in appreciable proportions, which may be mentioned, are believed to have the formulæ $C_8H_8$ and $C_4H_4$. These products in turn may be roughly separated by distillation.

It is also known that the crude mixture, any one of its constituents or mixtures of the various constituents may be polymerized in various ways, for instance, by aging at ordinary temperatures. The polymerization is greatly accelerated at elevated temperatures, and is known to take place either in the presence of oxygen or inert gases, as nitrogen. In the presence of oxygen, the polymerizing material will absorb oxygen with the development of compounds having explosive properties. Therefore, if it is desired to carry out the polymerization in an oxygen environment and at the same time produce a material free from chemically combined oxygen some method for inhibiting oxidation must be employed. One successful method already disclosed is to incorporate into the material to be polymerized a substance which will prevent oxygen absorption.

As the polymerization proceeds regardless of the method employed, the material passes successively to an oily, then to a gelatinous, then to a resinous mass, and finally yields a hard, brittle resinous material having unusual resistance to the action of water and to organic solvents. The oily product which is first formed is largely soluble in alcohol and acetone; the gelatinous body next formed is largely soluble in acetone but only partially soluble in alcohol; the resinous modification is substantially insoluble in alcohol and is to a slight extent soluble in acetone; the final, hard, brittle polymers are substantially insoluble in both alcohol and acetone. These successive polymerization products apparently consist of a group of compounds in various stages of polymerization and they may be only roughly separated by dissolving. They may be successively separated by distillation.

If the polymerization is stopped in the initial stages, the oily liquid polymer obtained may be separated from the volatile unpolymerized material by distillation. The resultant residue is a non-volatile substance having the general properties of a bodied drying oil. It has been shown that this drying oil may be used in the manufacture of paints or other coating compositions. It may be mixed with the solvents, pigments, fillers, etc., commonly employed in the preparation of coating compositions.

The example following illustrates the preparation from acetylene of the polymerizable polymer by the known method referred to above.

Example A 945 parts by weight of ammonium chloride, 1000 parts by weight of water, 2850 parts by weight of cuprous chloride, and 100 parts by weight of copper powder, are mixed and this mixture thoroughly agitated while passing into it acetylene gas. When the reaction slows up, as shown by a decrease in the rate of absorption of acetylene, the operation is discontinued, and the highly unsaturated hydrocarbon product formed is obtained by distillation, which is stopped when the condensed hydrocarbon is mixed with much water. The water is separated and returned to the reaction mass which, after cooling, is ready for the absorption of more acetylene. It is preferable, although not essential, to keep the reaction temperature at approximately 25° C. by suitable cooling of the reaction mass. As already stated, the resultant material contains a number of polymers the most abundant of which is believed to be divinylacetylene and to have the formula

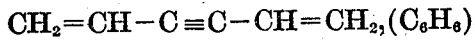

Other polymers produced in appreciable quantities are believed to have the formulæ: $C_8H_8$ and $C_4H_4$. These products may be roughly separated by distillation.

As illustrative of the partial polymerization by a known method of the material obtained in Example A, the following example is furnished.

Example B 1000 grams of pure divinylacetylene obtained from the product of Example A by distillation is boiled at atmospheric pressure and in the presence of air for four hours in a vessel provided with a condenser for the return of the condensed vapors to the reaction. The temperature of the boiling liquid is between 89° and 90° C. At the end of four hours the unchanged divinylacetylene is distilled off under reduced pressure. There remains, in 12 to 18% yield, a viscous non-volatile residue having the general properties of a bodied drying oil and consisting of the polymerized divinylacetylene.

The above examples, it will be understood, merely illustrate the preparation of the already known materials and are not a part of the present invention. It will be understood that any one of the first-step polymers or a mixture thereof may be polymerized similarly to the divinylacetylene of Example B and that the polymerization, instead of being discontinued at the oily stage as described in Example B, may be continued to any of the successive stages of partial polymerization described above or to obtain a solid polymer as the final product.

Object of the invention

Owing to their high degree of unsaturation, the characteristic behavior of the polymerizable acetylene polymers, as prepared by the methods described above, is to rapidly absorb oxygen and also to undergo further polymerization. It is the object of this invention to utilize the high degree of unsaturation to form from such polymers, other than by polymerization alone, more stable compounds, which compounds will have a decreased tendency to oxidize and polymerize and will themselves be valuable or will constitute valuable intermediates for the preparation of numerous, useful and novel compounds.

Description of invention

These objects are accomplished by decreasing the high unsaturation of the acetylene polymer molecule by adding on hydrogen through the agency of hydrogen gas with the aid of a catalyst. In this manner, compounds are produced which contain more hydrogen and as a result are less unsaturated, showing a decreased tendency to polymerize and absorb oxygen, chlorine, bromine, etc.

We have found that all of the acetylene polymers and polymerized acetylene polymers described above (see Prior art) will react with hydrogen under suitable conditions, with the possible exception of the substantially completely polymerized hard brittle solid polymer. The less highly polymerized solid polymers of the semi-plastic type, however, react normally.

The product of this hydrogenation is a mixture of saturated and unsaturated hydrocarbons, the average molecular weight of which is dependent upon the particular acetylene polymers started with and the percentage composition is dependent upon the catalyst, the temperature and pressure, and the quantity of hydrogen added. Thus, if one starts with the acetylene polymer thought to be divinylacetylene, $C_6H_6$, the reduced products will contain some or all of the following: hexane, hexene, hexadiene, hexatriene, ethylvinylacetylene and diethylacetylene; if the starting material be the tetramer of acetylene, $C_8H_8$, the products will contain octane and a series of unsaturated hydrocarbons of eight carbon atoms. In each of these cases, however, the relative quantities of the constituent products is determined by the catalyst, temperature, pressure, and quantity of hydrogen absorbed.

The invention will be readily understood from consideration of the following examples which of course are furnished by way of illustration.

Example I 780 parts (by weight) of the purified acetylene polymer as described under "A" (above) and thought to be divinylacetylene, are added to a solution containing 5000 parts of water, 5000 parts of ethyl alcohol, 5 parts of gelatine and colloidal palladium prepared by reducing 2 parts of $PdCl_2.2H_2O$. This reaction mixture is held at room temperature under an atmosphere of hydrogen while violently agitated until approximately 80 parts of hydrogen have been absorbed. The mixture is then steam distilled and the product purified by known methods giving a saturated oil which will not absorb bromine nor oxygen, having a boiling point of 68–70° C., a molecular weight of 86 and a density of 0.66 at 20° indicating it to be probably n-hexane, $C_6H_{14}$.

Example II 100 parts of the acetylene polymer used in Example 1 added to an equal quantity of sulfur-free decahydronaphthalene together with 1 part of platinum oxide, obtained by igniting chloroplatinic acid with sodium nitrate and washing the ignited oxide free of sodium, is placed under hydrogen at 2 to 3 atmospheres pressure and shaken until hydrogen is no longer absorbed. The product, after rectification, is identical with that obtained in Example I. The product may be removed from the catalyst by decantation and the catalyst used again.

*Example III*

100 parts of the acetylene polymer thought to be the tetramer $C_8H_8$ is hydrogenated in the manner of Example II and the resulting product no longer absorbs bromine, has a molecular weight of 114, a density of 0.71 at 15° C., a boiling point of 125° and is apparently octane.

*Example IV*

A mixture containing one volume of hydrogen and one volume of the acetylene polymer thought to be vinyl acetylene ($C_4H_4$) are passed over an active nickel catalyst at 80–150° C. at a rate such that the hydrogen is completely absorbed. The gaseous products may be collected in a suitable freezing mixture as a water white oil boiling from −5 to +10° C. thought to be a mixture of butane, butylene, butadiene and ethylacetylene.

*Example V*

100 parts of the polymerized acetylene polymers of Example B characterized as the viscous non-volatile oil is dissolved in two volumes of sulfur-free benzene containing 1 part of platinum catalyst used in Example II, is placed under 3 to 10 atmospheres pressure of hydrogen and violently agitated at a temperature between 25 to 100° C. until the hydrogen absorption is complete. Approximately 4.7–4.8 parts of hydrogen are absorbed giving, after removal of the benzene, a product similar to the original polymerized acetylene polymer, but showing a decreased tendency to absorb oxygen and bromine.

*Example VI*

The product described under Example A is heated for 7 hours at 85–95° C. in an atmosphere of nitrogen, then poured into 3 volumes of alcohol precipitating a resinous semi-solid product. 100 parts of this resinous solid are dissolved in benzene and hydrogenated as in Example V, giving upon removal of the solvent, a waxy amorphous product which will slowly absorb oxygen and which is still unsaturated as indicated by its absorption of bromine, but which resembles more nearly a paraffin-like substance in its physical properties.

*Example VII*

100 parts of the acetylene polymer thought to be divinylacetylene are dissolved in an equal volume of acetone and 5 parts of a reduced nickel catalyst supported on kieselguhr and containing about 40% nickel are added. This catalyst may be prepared by precipitating nickel hydroxide on kieselguhr and igniting in an atmosphere of hydrogen by well known methods. The mixture is placed under 2 to 10 atmospheres of hydrogen pressure and heated to 70–100° C. with violent agitation. When 2.5 parts of hydrogen have been absorbed, the product is removed and found to be different from the original material in that it absorbs oxygen more slowly and is less unsaturated with respect to bromine absorption. If the hydrogen absorption be allowed to continue, 5.5 or more parts may be added, progressively decreasing the unsaturation and tendency to absorb oxygen and bromine. The product obtained by this partial hydrogenation contains practically no hexane or hexene but is believed to contain hexatriene (boiling 75–80° C.), hexadienes, ethylvinylacetylene and diethylacetylene together with some unreduced acetylene polymers. This mixture may be separated by known methods of fractionation or may be used directly. It and some of its constituent hydrocarbon members have been found to possess valuable application as resin forming materials, intermediates for the preparation of alcohols, glycols, halogen compounds and their derivatives.

*Example VIII*

100 parts of the crude acetylene polymers prepared as described under Example A (above) are dissolved in an equal volume of acetone and hydrogenated as described in Example VII. The product is similar to that obtained in the previous example except that it contains unsaturated compounds containing 4 and 8 carbon atoms in addition to those containing 6 carbon atoms. It may be separated by known methods of fractionation into its constituent members.

It will be evident from the above examples that any desired amount of hydrogen up to approximately 10% of the starting weight of polymer may be added with a suitable catalyst. This reduction appears to take place in steps, therefore a different ratio of products results with change in the quantity of hydrogen absorbed. It is therefore possible to obtain high yields of hydrocarbons which are less unsaturated than the original acetylene polymer and varying in saturation to the completely saturated paraffin, as desired. The degree of saturation will, of course, in a given case, be determined by the contemplated use.

Obviously the reaction must be carried out in the absence of air and under non-oxidizing conditions generally.

It will be seen from the examples that these acetylene polymers, which are ordinarily inert toward gaseous hydrogen, will absorb it with rapidity in the presence of suitable catalysts.

The polymer may or may not be in solution as desired, or it may be mixed with a solvent in which it is only partially soluble. The solvent must be one which will not poison the catalyst nor react with any of the constituents under the conditions of the operation. Various solvents frequently affect the velocity of the hydrogen absorption thus permitting its control without having a detrimental effect upon the catalyst. The following solvents have been found valuable: acetic acid, methyl alcohol, ethyl alcohol, propyl alcohol, isopropyl alcohol, butyl alcohol, isobutyl alcohol, acetone, methyl acetate, ethyl acetate, propyl acetate, butyl acetate, methyl butyrate, ethyl butyrate, butyl butyrate, other esters of low molecular weight, mixtures of water with methyl and ethyl alcohols, acetone or acetic acid, benzene, toluene, xylene, tetrahydronaphthalene, decahydronaphthalene, cyclohexane, cyclohexanol, methylcyclohexane, pentane, hexane, heptane, octane, and other saturated hydrocarbons. Some solvents which are suitable under one set of conditions may be themselves reduced and unsuited under other conditions, thus with the use of a nickel catalyst at low temperature and pressure, acetone may be used, whereas at higher temperature it is reduced to isopropyl alcohol. This simultaneous reduction does not prevent the reduction of the acetylene polymer if sufficient hydrogen is present, but is generally best avoided in order to eliminate the loss of hydrogen.

When reduction is carried out in the liquid phase, either with or without a solvent, good agitation is necessary to get rapid reaction. A type of agitation which is adapted to bring in contact the hydrogen gas and the metallic catalyst is preferred.

We have further found that the hydrogenation may be carried out in the vapor phase by passing a mixture of the vaporized acetylene polymer and the desired amount of hydrogen through the catalyst. The catalyst must be mounted in a manner to allow temperature control, for after the reaction is started, a large quantity of heat is evolved which may decompose the reaction mixture. To aid in controlling the vapor phase reaction, both with regard to temperature and the quantity of hydrogen added, it is frequently advantageous to add an inert gas to the vapor mixture, such as nitrogen, dry steam, ethyl alcohol vapor, carbon dioxide, or the like.

Catalysts composed of metals of the first and eighth groups either alone or in combination with other metals or inert supports have been found useful for this hydrogenation; for example, reduced platinum black, pelladium black, colloidal palladium, osmium, reduced nickel, nickel on kieselguhr, nickel on alumina, nickel on silica, nickel and chromium, copper, copper and nickel with zinc, cobalt, etc.

The temperature and pressure necessary for the reaction are dependent upon the activity of the catalyst, thus with colloidal palladium, active hydrogen absorption will result at room temperature or lower and at reduced pressure, whereas the more common types of nickel catalyst require a temperature of over 70° C. and pressure of 2 atmospheres or more. The vapor phase reduction is conveniently carried out at 100–150° C. and atmospheric pressure. The practical limits of temperature may be therefore set at from 15° to 150° C., although slightly higher or lower temperatures may be employed.

It will be understood that the resulting products are mixtures of complex constitution and that it is impossible to state what is their exact chemical constitution. The unsaturated constituents of such mixtures will, of course, still polymerize and absorb oxygen but at a relatively lower rate than the original polymer. The hydrogenation also tends to lower the specific gravity and boiling point of the material treated.

As many apparent and widely different embodiments of this invention may be made without departing from the spirit thereof, it is to be understood that we do not limit ourselves to the foregoing examples or description except as indicated in the following claims.

We claim:

1. The process which comprises reacting under nonoxidizing conditions a polymerizable nonbenzenoid acetylene polymer, in the presence of a hydrogenation catalyst, with hydrogen.

2. The process which comprises reacting under nonoxidizing conditions a polymerizable nonbenzenoid acetylene polymer, in the presence of a hydrogenation catalyst and at a temperature between 15° and 150° C., with hydrogen.

3. The process which comprises reacting under nonoxidizing conditions a polymerizable nonbenzenoid acetylene polymer, in the presence of a hydrogenation catalyst and in the absence of air, with hydrogen.

4. The process which comprises reacting under nonoxidizing conditions a polymerizable nonbenzenoid acetylene polymer, in the presence of a hydrogenation catalyst and in the absence of air, with hydrogen, said polymer being dissolved in a solvent.

5. The process which comprises reacting under nonoxidizing conditions a polymerizable nonbenzenoid polymer of acetylene with hydrogen in the presence of a metal of the class consisting of the first and eighth groups.

6. The process which comprises agitating, at between 15° and 150° C., a polymerizable nonbenzenoid polymer of acetylene in the presence of an atmosphere of hydrogen, a hydrogenation catalyst and a neutral solvent until up to 10% by weight of hydrogen as compared to the original weight of the polymer has been absorbed.

7. The process which comprises reacting under nonoxidizing conditions divinylacetylene, in the presence of a hydrogenation catalyst, with hydrogen.

8. The process which comprises reacting under nonoxidizing conditions divinylacetylene, in the presence of a hydrogenation catalyst and in the absence of air, with hydrogen.

9. The process which comprises agitating, at between 15° and 150° C., divinylacetylene in the presence of an atmosphere of hydrogen, a hydrogenation catalyst and a neutral solvent until up to 10% by weight of hydrogen as compared to the original weight of the polymer has been absorbed.

10. The process which comprises mixing 100 parts of divinylacetylene with a substantially equal volume of a neutral solvent and a hydrogenation catalyst, placing the mixture under from 2 to 10 atmospheres of hydrogen pressure, heating to 70–100° C., and agitating violently to effect the absorption of hydrogen.

11. The process which comprises agitating, at between 15° and 150° C., a polymerizable nonbenzenoid polymer of acetylene in the presence of an atmosphere of hydrogen, a nickel catalyst and a neutral solvent until up to 10% by weight of hydrogen as compared to the original weight of the polymer has been absorbed.

12. The process which comprises agitating, at between 15° and 150° C., divinylacetylene in the presence of an atmosphere of hydrogen, a neutral solvent and a catalyst comprising reduced nickel until up to 10% by weight of hydrogen as compared to the original weight of the polymer has been absorbed.

13. The process which comprises mixing 100 parts of divinylacetylene with a substantially equal volume of a neutral solvent and 5 parts of a catalyst of reduced nickel on kieselguhr, placing the mixture under from 2 to 10 atmospheres of hydrogen pressure, heating to 70–100° C., and agitating violently to effect the absorption of hydrogen.

14. A mixture of saturated and unsaturated hydrocarbons obtainable by hydrogenating a polymerizable nonbenzenoid acetylene polymer.

15. A mixture of saturated and unsaturated hydrocarbons obtainable by reacting under non-oxidizing conditions a polymerizable nonbenzenoid acetylene polymer, in the presence of a hydrogenation catalyst, with hydrogen.

16. A mixture of saturated and unsaturated hydrocarbons obtainable by reacting under non-oxidizing conditions a polymerizable nonbenzenoid acetylene polymer, in the presence of the hydrogenation catalyst and in the absence of air, with hydrogen, said polymer being dissolved in a solvent which is not reduced under the conditions of the reaction.

17. A mixture of saturated and unsaturated hydrocarbons obtainable by agitating, at between 15° and 150° C., a polymerizable nonbenzenoid polymer of acetylene in the presence of an atmosphere of hydrogen, a hydrogenation catalyst and a neutral solvent until up to 10% by weight of hydrogen as compared to the original weight of the polymer has been absorbed.

18. A mixture of saturated and unsaturated hydrocarbons obtainable by reacting under non-oxidizing conditions a polymerizable nonbenzenoid acetylene polymer, in the presence of a hydrogenation catalyst, with hydrogen.

19. A mixture containing saturated and unsaturated hydrocarbons of 6 carbon atoms and obtainable by mixing 100 parts of divinylactylene with a substantially equal volume of a neutral solvent and a hydrogenation catalyst, placing the mixture under from 2 to 10 atmospheres of hydrogen pressure, heating to 70–100° C., and agitating violently to effect the hydrogenation of the polymer.

In testimony whereof we affix our signatures.

WILLIAM S. CALCOTT.
ALBERT S. CARTER.
FREDERICK B. DOWNING.